United States Patent Office 3,066,174
Patented Nov. 27, 1962

3,066,174
RETARDING DISCOLORATION OF CARBON TETRACHLORIDE
Ralph B. Thompson, Hinsdale, and William K. T. Gleim, Island Lake, Ill., assignors to Universal Oil Products Company, Des Plaines, Ill., a corporation of Delaware
No Drawing. Filed Dec. 21, 1959, Ser. No. 860,670
17 Claims. (Cl. 260—652.5)

This invention relates to a novel method of retarding discoloration of carbon tetrachloride.

Carbon tetrachloride is transported in tank cars, trucks, etc., and inevitably is in contact with water. The water may come from various sources including water remaining from rinsing out the tank car, water condensed from the atmosphere, etc. Similarly carbon tetrachloride, when kept in storage tanks, comes in contact with water. Because of the low solubility of carbon tetrachloride in water, the water generally exists as a separate phase.

It has been found that carbon tetrachloride in contact with a separate water phase and steel undergoes discoloration. This discoloration is undesirable because it is an indication that the carbon tetrachloride is not pure and also may interfere with the subsequent use of the carbon tetrachloride. The present invention is directed to a novel method of retarding the discoloration.

The discoloration of carbon tetrachloride is peculiar in that similar discoloration of other chlorinated hydrocarbons does not occur. Furthermore, the discoloration is a different reaction from that of corrosion. The additives of the present invention satisfactorily retard discoloration of carbon tetrachloride but are substantially ineffective to retard corrosion of the steel containers. It is apparent, from the above two observations, that this discoloration is a unique phenomenon which is peculiar to carbon tetrachloride and which is different from corrosion reactions.

In one embodiment the present invention relates to a method of retarding discoloration of carbon tetrachloride in contact with steel and a separate water phase which comprises incorporating therein both a water soluble alkali metal nitrite and a water soluble base in a concentration to maintain the pH of said water phase above 7.

In a specific embodiment the present invention relates to a method of retarding discoloration of carbon tetrachloride in contact with steel and a separate water phase which comprises incorporating therein both sodium nitrite and sodium hydroxide in a concentration to maintain the pH of said water phase to from about 8 to about 10.

Any suitable water soluble alkali metal nitrite may be used in accordance with the present invention. A particularly preferred alkali metal nitrite is sodium nitrite. Other alkali metal nitrites include potassium nitrite, lithium nitrite, rubidium nitrite, cesium nitrite, etc. It is understood that the various alkali metal nitrites are not necessarily equivalent.

It also is essential that the pH of the water phase be above 7 and preferably from about 8 to 12 and still more particularly from about 8 to 10. Regulation of the pH of the water phase is accomplished readily by adding a water soluble base in a sufficient concentration. Any suitable water soluble base may be used for this purpose. Sodium hydroxide and potassium hydroxide are preferred. Other water soluble bases include sodium borate, sodium carbonate, sodium bicarbonate, etc., potassium borate, potassium carbonate, potassium bicarbonate, etc., lithium borate, lithium carbonate, lithium bicarbonate, etc., rubidium borate, rubidium carbonate, rubidium bicarbonate, etc., cesium borate, cesium carbonate, cesium bicarbonate, etc., ammonium hydroxide, ammonium borate, ammonium carbonate, ammonium bicarbonate, etc. It is understood that any suitable base which serves to maintain the pH of the water phase within the desired limits may be employed in the present invention.

The alkali metal nitrite and base to control pH may be incorporated in any suitable manner. In one method, the carbon tetrachloride will be pumped into a storage tank or tank car, after which the desired concentration of alkali metal nitrite and base are added thereto. In another method, the alkali metal nitrite and base are poured into the storage tank, tank car, etc., and the carbon tetrachloride then pumped therein. The alkali metal nitrite and base may be commingled, generally as an aqueous solution, and then added, or each is added separately. Generally the transportation and/or storage of carbon tetrachloride is at ambient temperature although these may be at elevated temperature which generally will not exceed about 200° F.

The concentration of alkali metal nitrite is sufficient to effectively retard discoloration of the carbon tetrachloride. The concentration of alkali metal nitrite will be within the range of from about 0.001% to about 5% and preferably from about 0.01% to about 1% by weight of the carbon tetrachloride. The concentration of base will be sufficient to maintain the pH of the water phase within the desired range as hereinbefore set forth.

The following examples are introduced to illustrate further the novelty and utility of the present invention but not with the intention of unduly limiting the same.

EXAMPLE I

A sample of carbon tetrachloride (100 cc.) was stored at 100° F. in the presence of a steel strip in an aqueous phase (50 cc.). After 12 days the carbon tetrachloride underwent discoloration, with the formation of a brown-colored material in solution in the carbon tetrachloride and also with the formation of hexachloroethane.

EXAMPLE II

Another sample of the carbon tetrachloride was stored as described in Example I except that sodium hydroxide was added to give the water phase a pH of greater than 10. Discoloration of the carbon tetrachloride began after 28 days.

EXAMPLE III

Additional samples of the carbon tetrachloride were stored as described in Example I except that sodium nitrite (0.5 gram) was added along with the sodium hydroxide. The concentration of sodium hydroxide was varied to give the pH shown in the following table. This table also reports the days to first discoloration.

Table I

| Sample | pH | Days |
|--------|------|------|
| 3 | 7.5 | 73 |
| 4 | 8.4 | 35 |
| 5 | 10.0 | 64 |
| 6 | 12.0 | 49 |

From the data in the above table, it will be seen that the sodium nitrite was effective to retard discloration of the carbon terachloride. Also, from these data it will be seen that the pH preferably is maintained within the range of from about 8 to about 10.

EXAMPLE IV

As hereinbefore set forth, the discoloration of carbon tetrachloride is different from the corrosion reaction. This is illustrated in the present example in which potassium chromate, a well-known corrosion inhibitor, was incorporated in another sample of the carbon tetrachloride and water, and stored as described in Example I. Discoloration of the carbon tetrachloride began in less than 20 days of storage.

EXAMPLE V

Also as hereinbefore set forth, discoloration of carbon terachloride is peculiar thereto, and does not occur in other chlorinated hydrocarbons. Samples of the following chlorinated hydrocarbons were stored with water but without added alkali metal nitrites or base in the same manner as described in Example I. These chlorinated hydrocarbons were (1) 1,1,1,-trichloroethane, (2) methylene chloride, (3) ethylene chloride, (4) chloroform and (5) trichloroethylene. After 80 days or storage at 100° F. no discolor was observed.

From the above data it will be seen that the phenomenon of discoloration is peculiar to carbon tetrachloride and does not occur with the other chlorinated hydrocarbons set forth above.

EXAMPLE VI

Carbon tetrachloride is pumped into a tank car for transportation to a customer in a different locality. A solution of potassium nitrite in aqueous potassium hydroxide is prepared and this solution is added to the tank car containing the carbon tetrachloride to incroporate therein 0.01% by weight of potassium nitrite and to impart a pH of 8.5 to the aqueous phase therein.

We claim as our invention:

1. A method of retarding discoloration of carbon tetrachloride in contact with steel and a separate water phase which comprises incorporating into said water phase from about 0.001% to about 5% by weight of a water soluble alkali metal nitrite and also a water soluble base in a concentration to maintain the pH of said water phase above 7.

2. A method of retarding discoloration of carbon tetrachloride in contact with steel and a separate water phase which comprises incorporating into said water phase from about 0.001% to about 5% by weight of sodium nitrite and also a water soluble base in a concentration to maintain the pH of said water phase from about 8 to about 12.

3. A method of retarding discoloration of carbon tetrachloride in contact with steel and a separate water phase which comprises incorporating into said water phase from about 0.001% to about 5% by weight of potassium nitrite and also a water soluble base in a concentration to maintain the pH of said water phase from about 8 to about 12.

4. A method of retarding discoloration of carbon tetrachloride in contact with steel and a separate water phase which comprises incorporating into said water phase from about 0.001% to about 5% by weight of sodium nitrite and also sodium hydroxide in a concentration to maintain the pH of said water phase from about 8 to about 10.

5. A method of retarding discoloration of carbon tetrachloride in contact with steel and a separate water phase which comprises incorporating into said water phase from about 0.001% to about 5% by weight of sodium nitrite and also ammonium hydroxide in a concentration to maintain the pH of said water phase from about 8 to about 10.

6. A method of retarding discoloration of carbon tetrachloride in contact with steel and a separate water phase which comprises incorporating into said water phase from about 0.001% to about 5% by weight of potassium nitrite and also potassium hydroxide in a concentration to maintain the pH of said water phase from about 8 to about 10.

7. A method of retarding discoloration of carbon tetrachloride in contact with steel and a separate water phase which comprises incorporating into said water phase from about 0.001% to about 5% by weight of potassium nitrite and also ammonium hydroxide in a concentration to maintain the pH of said water phase from about 8 to about 10.

8. Carbon tetrachloride in contact with steel and a water phase having a pH above 7, said water phase containing a water soluble alkali metal nitrite in an amount of from about 0.001% to about 5% by weight of the carbon tetrachloride.

9. Carbon tetrachloride in contact with steel and a water phase having a pH of from about 8 to about 12, said water phase containing sodium nitrite in an amount of from about 0.001% to about 5% by weight of the carbon tetrachloride.

10. Carbon tetrachloride in contact with steel and a water phase having a pH of from about 8 to about 12, said water phase containing potassium nitrite in an amount of from about 0.001% to about 5% by weight of the carbon tetrachloride.

11. Carbon tetrachloride in contact with steel and a water phase containing an alkali metal nitrite in an amount of from about 0.001% to about 5% by weight of the carbon tetrachloride and a water soluble base in a concentration to maintain the pH of said water phase above 7.

12. Carbon tetrachloride in contact with steel and a water phase containing sodium nitrite in an amount of from about 0.001% to about 5% by weight of the carbon tetrachloride and a water soluble base in a concentration to maintain the pH of said water phase above 7.

13. Carbon tetrachloride in contact with steel and a water phase containing potassium nitrite in an amount of from about 0.001% to about 5% by weight of the carbon tetrachloride and a water solube base in a concentration to maintain the pH of said water phase above 7.

14. Carbon tetrachloride in contact with steel and a water phase containing sodium nitrite in an amount of from about 0.001% to about 5% by weight of the carbon tetrachloride and sodium hydroxide in a concentration to maintain the pH of said water phase to from about 8 to about 10.

15. Carbon tetrachloride in contact with steel and a water phase containing sodium nitrite in an amount of from about 0.001% to about 5% by weight of the carbon tetrachloride and ammonium hydroxide in a concentration to maintain the pH of said water phase to from about 8 to about 10.

16. Carbon tetrachloride in contact with steel and a water phase containing potassium nitrite in an amount of from about 0.001% to about 5% by weight of the carbon tetrachloride and potassium hydroxide in a concentration to maintain the pH of said water phase to from about 8 to about 10.

17. Carbon tetrachloride in contact with steel and a water phase containing potassium nitrite in an amount of from about 0.001% to about 5% by weight of the carbon tetrachloride and ammonium hydroxide in a concentration to maintain the pH of said water phase to from about 8 to about 10.

References Cited in the file of this patent

UNITED STATES PATENTS

| | | |
|---|---|---|
| 2,119,873 | Wiezevich | June 7, 1938 |
| 2,990,421 | Kharasch et al. | Aug. 18, 1959 |
| 2,959,623 | Pray et al. | Nov. 8, 1960 |